(12) United States Patent
Yang et al.

(10) Patent No.: US 10,048,898 B2
(45) Date of Patent: Aug. 14, 2018

(54) DATA RETENTION IN A MEMORY BLOCK BASED ON LOCAL HEATING

(71) Applicant: SanDisk Technologies Inc., Plano, TX (US)

(72) Inventors: Niles Yang, Mountain View, CA (US); Xinde Hu, San Jose, CA (US); Zhenlei Shen, Milpitas, CA (US)

(73) Assignee: SanDisk Technologies LLC, Plano, TX (US)

( * ) Notice: Subject to any disclaimer, the term of this patent is extended or adjusted under 35 U.S.C. 154(b) by 183 days.

(21) Appl. No.: 14/739,863

(22) Filed: Jun. 15, 2015

(65) Prior Publication Data

US 2016/0364175 A1    Dec. 15, 2016

(51) Int. Cl.
*G06F 12/00* (2006.01)
*G06F 12/02* (2006.01)
*G06F 3/06* (2006.01)

(52) U.S. Cl.
CPC .......... *G06F 3/0679* (2013.01); *G06F 3/0616* (2013.01); *G06F 3/0647* (2013.01)

(58) Field of Classification Search
CPC ..... G06F 3/0616; G06F 3/0647; G06F 3/0679
See application file for complete search history.

(56) References Cited

U.S. PATENT DOCUMENTS

| 7,366,997 B1 * | 4/2008 | Rahmat | G06F 17/5036 716/111 |
| 2008/0140909 A1 * | 6/2008 | Flynn | G06F 1/183 711/100 |

* cited by examiner

*Primary Examiner* — Yong Choe
(74) *Attorney, Agent, or Firm* — Brinks Gilson & Lione (57) ABSTRACT

A storage device with a memory may include memory block leveling that improves data retention by considering localized temperature. A block's distance from a heat source may result in variance of data retention. The localized temperature may be used to improve data retention through a relocation, refreshing, or leveling of blocks that considers their physical location on the die and/or in the package.

20 Claims, 11 Drawing Sheets

DATA RETENTION IN A MEMORY BLOCK BASED ON LOCAL HEATING

TECHNICAL FIELD

This application relates generally to memory devices. More specifically, this application relates to improving data retention with block data retention leveling that considers localized heating and relative temperature in memory system.

BACKGROUND

Non-volatile memory systems, such as flash memory, have been widely adopted for use in consumer products. Flash memory may be found in different forms, for example in the form of a portable memory card that can be carried between host devices or as a solid state disk (SSD) embedded in a host device. As the non-volatile memory cell scales to smaller dimensions with higher capacity per unit area, the cell endurance due to program and erase cycling, and disturbances (e.g. due to either read or program) may become more prominent. The overall vulnerability of memory cells and the defect level during the silicon process may become elevated as the cell dimension shrinks and process complexity increases, which directly affects the data integrity at both the memory and system. In particular, temperature may cause disparities within a block or within a die regarding defects.

Data retention (DR) may be worse at higher temperatures because electrons for each of the charge values may be lost over time, which may eventually result in data loss. Increased temperatures may accelerate the electron loss. Likewise, extended time or exposure to high temperatures may result in a shift of the levels (i.e. thresholds). The use of a temperature sensor to monitor changing temperatures and adjust for the effects of higher temperatures may not be effective because the sensor only measures the local temperature at the location of the sensor and does not account for local changes in temperature. Accurately accounting for temperature effects on the blocks within a die may improve data retention.

DESCRIPTION OF THE EMBODIMENTS

A storage device with a memory may include improved memory block leveling in terms of data retention. A block data retention leveling ("BDRL") scheme may increase the memory system's endurance under the data retention ("DR") requirements and improve the data retention under the endurance requirements. The BDRL may handle data retention by considering their physical location on the die and in the package (e.g. a system with a multi-die package and large memory array within the die). Memory blocks are located in the memory array, at different distances away from the memory peripheral circuitry which controls the memory array. The heating of the memory die during the intense operation may not be uniform, depending on how far a particular memory block is from the heat source (e.g. peripheral circuitry). Accordingly, the variance of local temperature within memory die may result in a variance of data retention characteristics of those memory blocks.

Data retention ("DR") may refer to the ability of a memory bit to retain its data state over time. Poor DR means that a memory bit loses its data state (i.e. loses charge). DR may be decreased when the temperature increases. The loss of charge in a memory cell may result in a change of state which is further described below with respect to FIGS. 6-8. There may be two types of DR within a memory system: 1) ambient temperature induced DR; and 2) localized block DR. Ambient temperature induced DR is where all the blocks in the same die are affected in the same manner (i.e. blocks are at same temperature). In other words, the dies within the same package may be affected uniformly as the ambient temperature elevation equally impacts all dies in the system. Conversely, localized block DR may result from a heating source within the die that affects the blocks differently. The dies that are closer to the heating source may have different DR effects from the blocks that are a greater distance from the heating source. In one example, peripheral circuit elements may act as a heating source. Exemplary peripheral circuit elements may include clocks, pumps, ESD, current shunt, current sink, and/or closely-packed logic circuits.

The block data retention leveling ("BDRL") module or algorithm that is described below addresses localized block DR by considering a distance from a heat source when leveling or refreshing blocks. In particular, blocks that are subject to higher local temperatures (e.g. based on proximity to a heat source) may have poor DR. Likewise, blocks that are a greater distance from the heat source may be used more frequently because DR is not as big a problem as with blocks that have a higher local temperature.

Figure 1A:
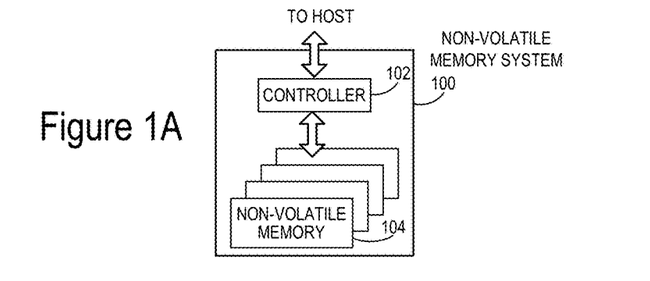
FIG. 1A is a block diagram of an example non-volatile memory system.

FIGS. 1A-2B are exemplary memory systems which may implement BDRL. FIG. 1A is a block diagram illustrating a non-volatile memory system. The non-volatile memory system 100 includes a controller 102 and non-volatile memory that may be made up of one or more non-volatile memory die 104. As used herein, the term die refers to the set of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104. The non-volatile memory die 104 may store an operating system for the host.

Examples of host systems include, but are not limited to, personal computers (PCs), such as desktop or laptop and other portable computers, tablets, mobile devices, cellular telephones, smartphones, personal digital assistants (PDAs), gaming devices, digital still cameras, digital movie cameras, and portable media players. For portable memory card applications, a host may include a built-in receptacle for one or more types of memory cards or flash drives, or a host may require adapters into which a memory card is plugged. The memory system may include its own memory controller and drivers but there may also be some memory-only systems that are instead controlled by software executed by the host to which the memory is connected. In some memory systems containing the controller, especially those embedded within a host, the memory, controller and drivers are often formed on a single integrated circuit chip. The host may communicate with the memory card using any communication protocol such as but not limited to Secure Digital (SD) protocol, Memory Stick (MS) protocol and Universal Serial Bus (USB) protocol.

The controller 102 (which may be a flash memory controller) can take the form of processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address). The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, memory system 100 may be a card based system, such as a secure digital (SD) or a micro secure digital (micro-SD) card. In an alternate embodiment, memory system 100 may be part of an embedded memory system. For example, the flash memory may be embedded within the host, such as in the form of a solid state disk (SSD) drive installed in a personal computer.

Although in the example illustrated in FIG. 1A, non-volatile memory system 100 includes a single channel between controller 102 and non-volatile memory die 104, the subject matter described herein is not limited to having a single memory channel. For example, in some NAND memory system architectures, such as in FIGS. 1B and 1C, 2, 4, 8 or more NAND channels may exist between the controller and the NAND memory device, depending on controller capabilities. In any of the embodiments described herein, more than a single channel may exist between the controller and the memory die, even if a single channel is shown in the drawings.

Figure 1B:
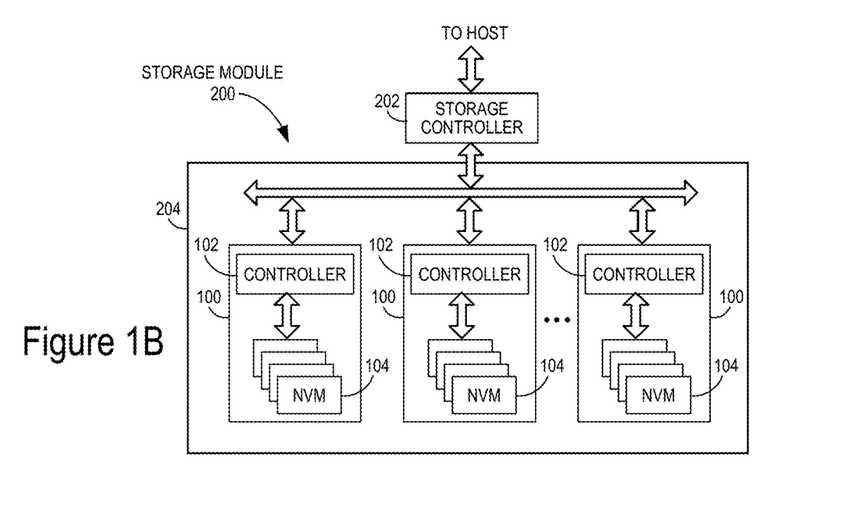
FIG. 1B is a block diagram of a storage module that includes a plurality of non-volatile memory systems.

FIG. 1B illustrates a storage module 200 that includes plural non-volatile memory systems 100. As such, storage module 200 may include a storage controller 202 that interfaces with a host and with storage system 204, which includes a plurality of non-volatile memory systems 100. The interface between storage controller 202 and non-volatile memory systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

Figure 1C:
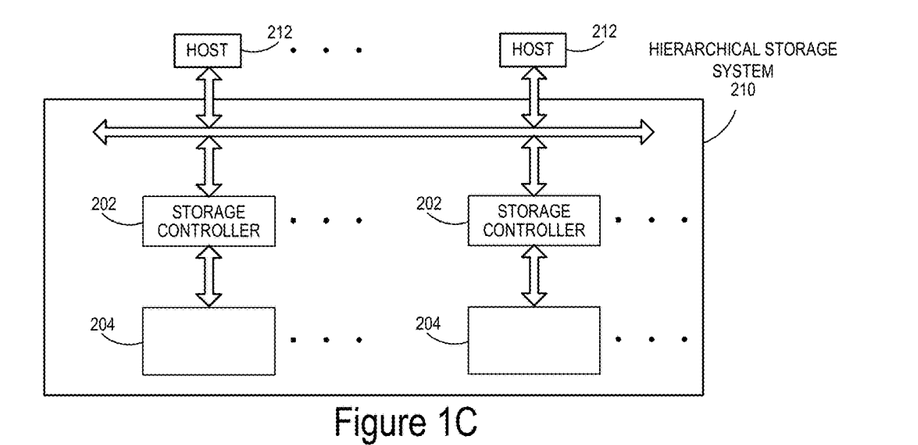
FIG. 1C is a block diagram of a hierarchical storage system.

FIG. 1C is a block diagram illustrating a hierarchical storage system. A hierarchical storage system 210 includes a plurality of storage controllers 202, each of which control a respective storage system 204. Host systems 212 may access memories within the hierarchical storage system via a bus interface. In one embodiment, the bus interface may be a non-volatile memory express (NVMe) or a fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
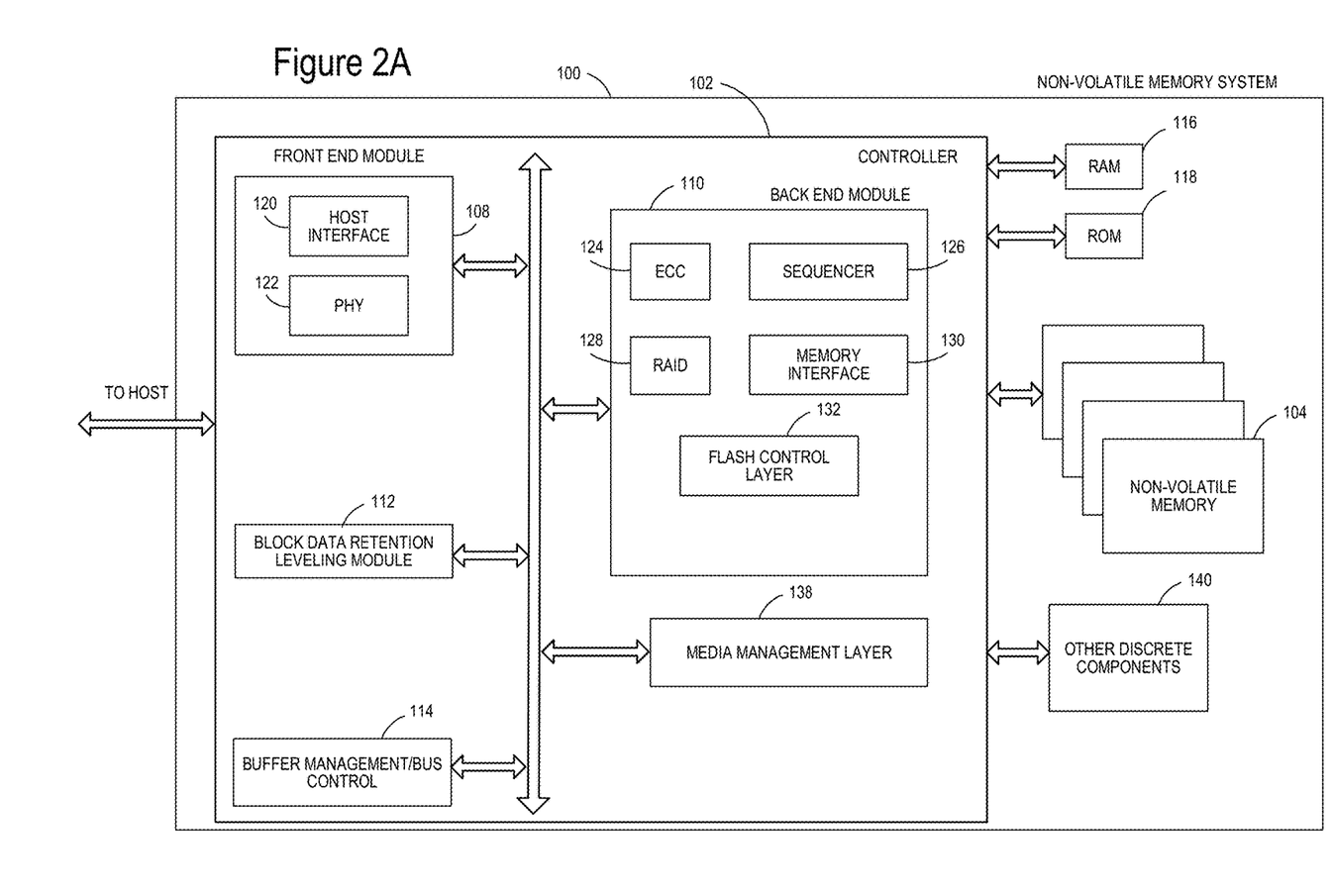
FIG. 2A is a block diagram of exemplary components of a controller of a non-volatile memory system.

FIG. 2A is a block diagram illustrating exemplary components of controller 102 in more detail. Controller 102 includes a front end module 108 that interfaces with a host, a back end module 110 that interfaces with the one or more non-volatile memory die 104, and various other modules that perform functions which will now be described in detail.

A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory 104, for example, that comprises instructions executable with a processor to implement one or more of the features of the module. When any one of the modules includes the portion of the memory that comprises instructions executable with the processor, the module may or may not include the processor. In some examples, each module may just be the portion of the memory 104 or other physical memory that comprises instructions executable with the processor to implement the features of the corresponding module.

Figure 3:
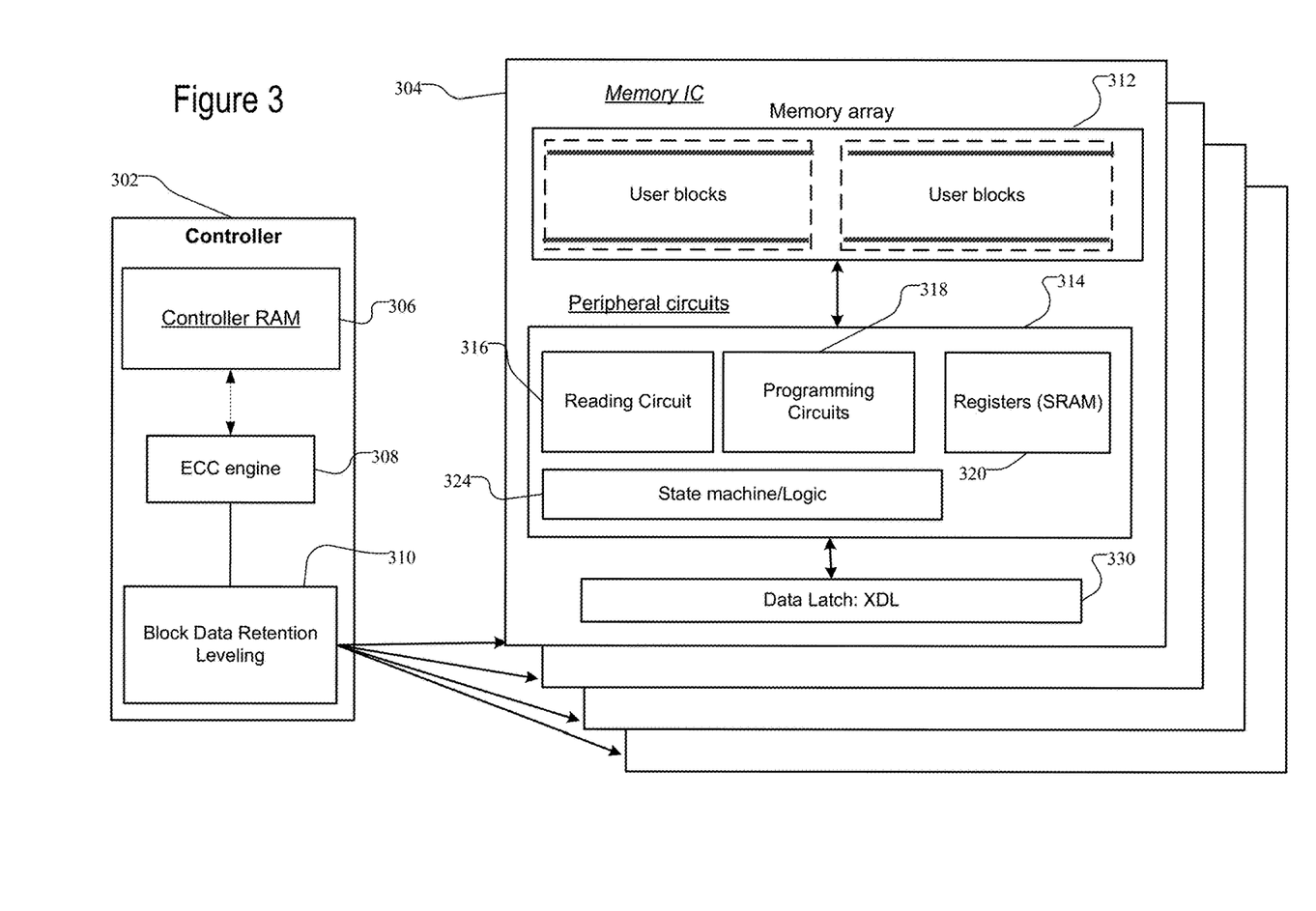
FIG. 3 is a block diagram of an exemplary memory controller and memory array.

The controller 102 may include a block data retention leveling ("BDRL") module 112. The BDRL module 112 may analyze localized heating when relocating blocks. The localized heating may be based on a distance from a heat source or based on the location of a die. The relocation of blocks based on the localized heating may be used for wear leveling or improving data retention. The relocation is further described with respect to FIGS. 9-10. FIG. 3 illustrates an alternative embodiment of the memory system and illustrates an alternative block data retention leveling module.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller. Further, in some implementations, the controller 102, RAM 116, and ROM 118 may be located on separate semiconductor die.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the non-volatile memory system 100. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

Additional components of system 100 illustrated in FIG. 2A include media management layer 138, which performs wear leveling of memory cells of non-volatile memory die 104. System 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

The FTL or MML 138 may be integrated as part of the flash management that may handle flash errors and interfacing with the host. In particular, MML may be a module in flash management and may be responsible for the internals of NAND management. In particular, the MML 138 may include an algorithm in the memory device firmware which translates writes from the host into writes to the flash memory 104. The MML 138 may be needed because: 1) the flash memory may have limited endurance; 2) the flash memory 104 may only be written in multiples of pages; and/or 3) the flash memory 104 may not be written unless it is erased as a block. The MML 138 understands these potential limitations of the flash memory 104 which may not be visible to the host. Accordingly, the MML 138 attempts to translate the writes from host into writes into the flash memory 104. As described below, erratic bits may be identified and recorded using the MML 138. This recording of erratic bits can be used for evaluating the health of blocks.

Figure 2B:
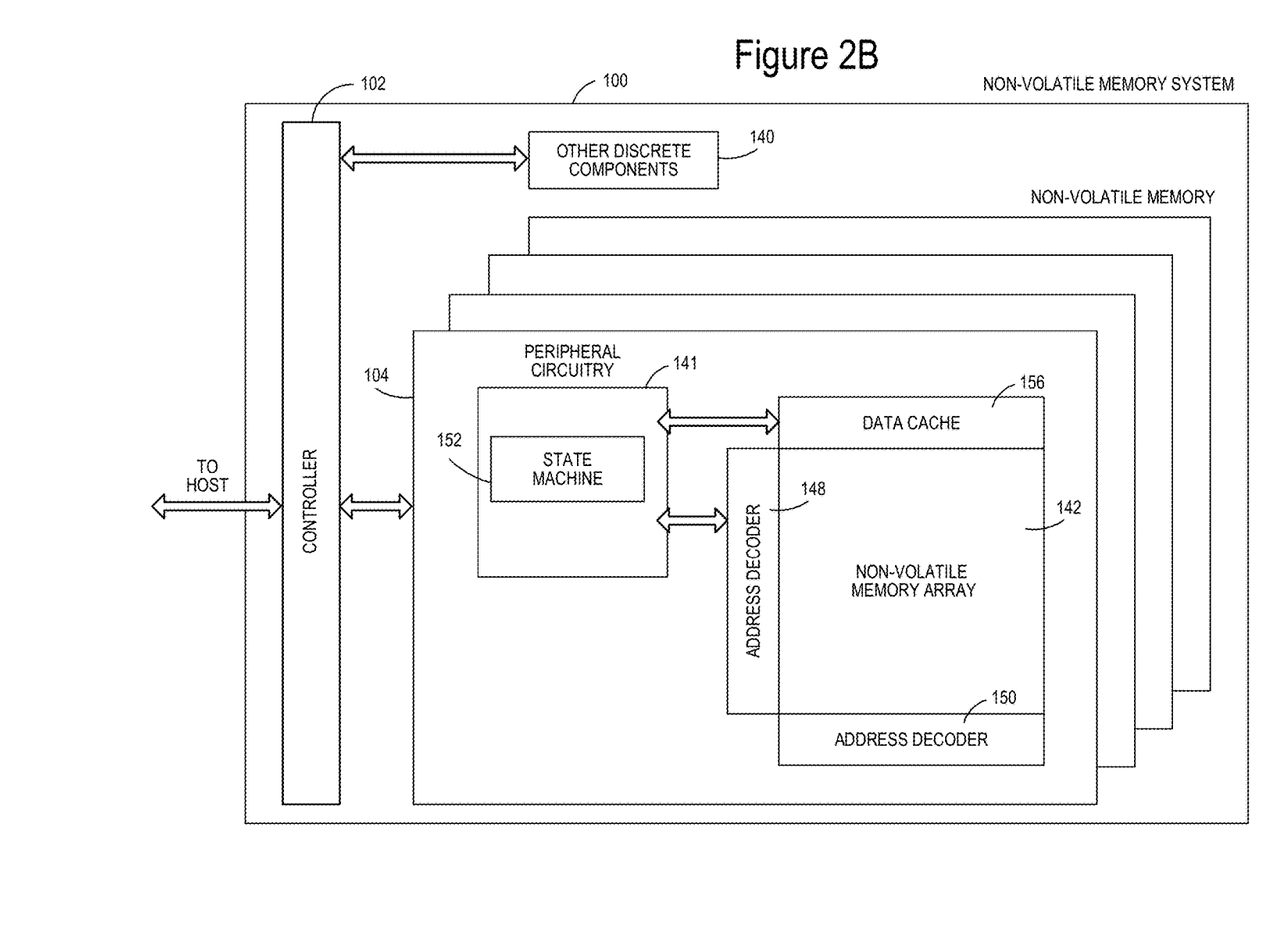
FIG. 2B is a block diagram of exemplary components of a non-volatile memory of a non-volatile memory storage system.

FIG. 2B is a block diagram illustrating exemplary components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including NAND flash memory cells and/or NOR flash memory cells in a two dimensional and/or three dimensional configuration. Peripheral circuitry 141 includes a state machine 152 that provides status information to controller 102. Non-volatile memory die 104 further includes a data cache 156 that caches data.

In one embodiment, the peripheral circuitry 141 may be a heat source. The location of the peripheral circuitry 141 relative a block may affect the temperature of that block, such that blocks closest to the peripheral circuitry 141 may have the highest local temperature. Exemplary peripheral circuitry 141 may include clocks, pumps, ESD, current shunt, current sink, and/or closely-packed logic circuits.

FIG. 3 is a block diagram of an exemplary memory controller and memory array. FIG. 3 illustrates an alternative embodiment of the memory system shown in FIGS. 1-2, and illustrates alternative block data retention leveling ("BDRL") module. The memory controller 302 is coupled with the memory integrated circuit (IC) 304. Although not labeled, there may be a plurality of memory ICs 304 that may correspond to a plurality of dies. The controller 302 includes random access memory (RAM) 306 and an error correction code (ECC) engine 308. The controller may also include the BDRL 310, which may communicate with each of the memory ICs 304 in order to utilize the location from the peripheral circuits 314 or the positioning of a particular memory IC 304. Rather than being located on the controller 302, the BDRL 310 may alternatively be located on the memory integrated circuit 304. Each of the memory ICs 304 may include a memory array of user blocks 312 and peripheral circuits 314. The peripheral circuits 314 shown in FIG. 3 are merely exemplary and may include the peripheral circuitry 141 shown in FIG. 2B. The peripheral circuits 314 may also include a reading circuit 316 for reading data from the user blocks 312 and programming circuits 318 for programming data to the user blocks 312. Registers 320 may be static RAM and there may be state machine 324 or other logic. A transfer data latch XDL 330 may communicate with the controller.

Figure 4:
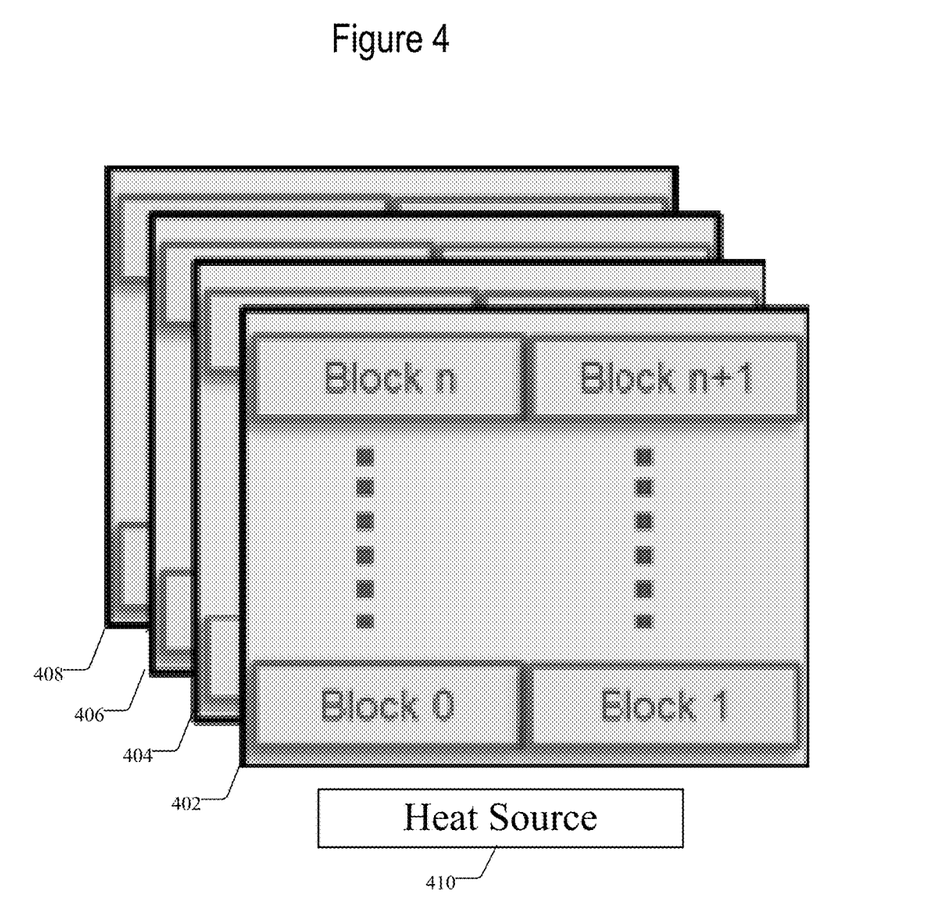
FIG. 4 is diagram of a package with an array of flash dies.

FIG. 4 is diagram of a package with an array of flash dies. In particular, FIG. 4 illustrates four flash dies 402, 404, 406, 408. Each of the flash die, include blocks. A heat source 410 may be one or more circuits that produce heat. As described above, the heat source 410 may include any of the peripheral circuitry (141 or 314) that produces heat. As shown, block 0 and block 1 from each of the flash dies 402, 404, 406, 408 are closest to the heat source 410 and would have the highest localized temperature and be most susceptible to data retention problems. Likewise, the dies 404, 406 in the middle have a higher temperature because of decreased airflow and lack of heat dissipation. The end dies 402, 408 have increased airflow which can lower the temperatures. Accordingly, data retention may be improved based on either: 1) increased distance from the heat source 410; or 2) location on an end die 402, 408.

Figure 5:
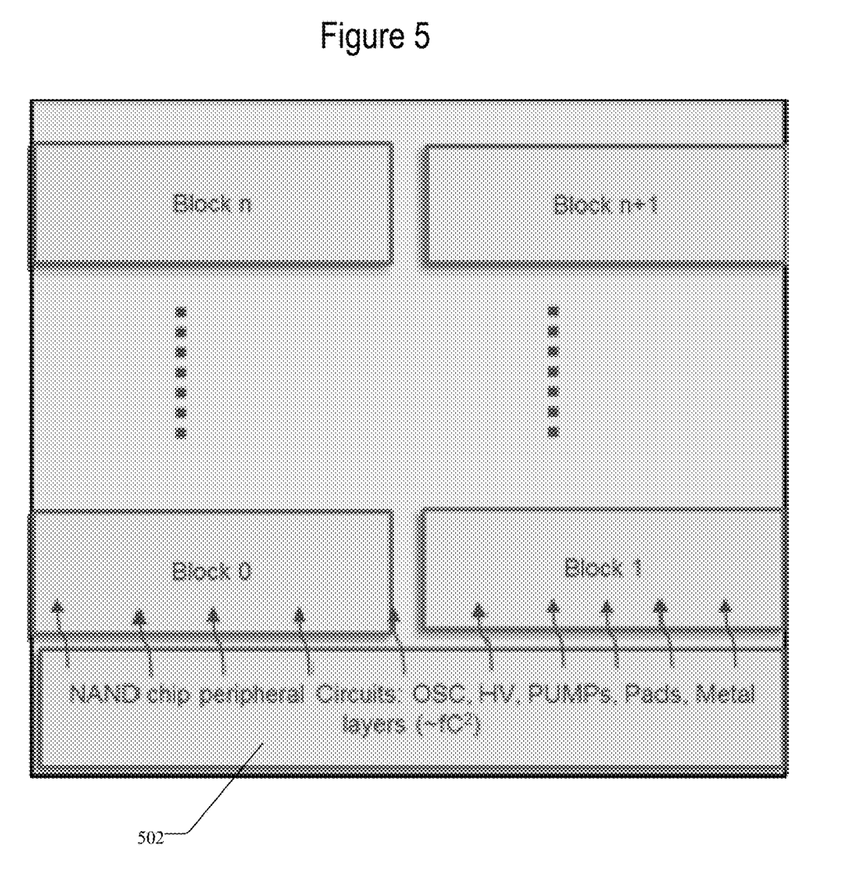
FIG. 5 is diagram of a memory block including peripheral circuits.
Figure 6:
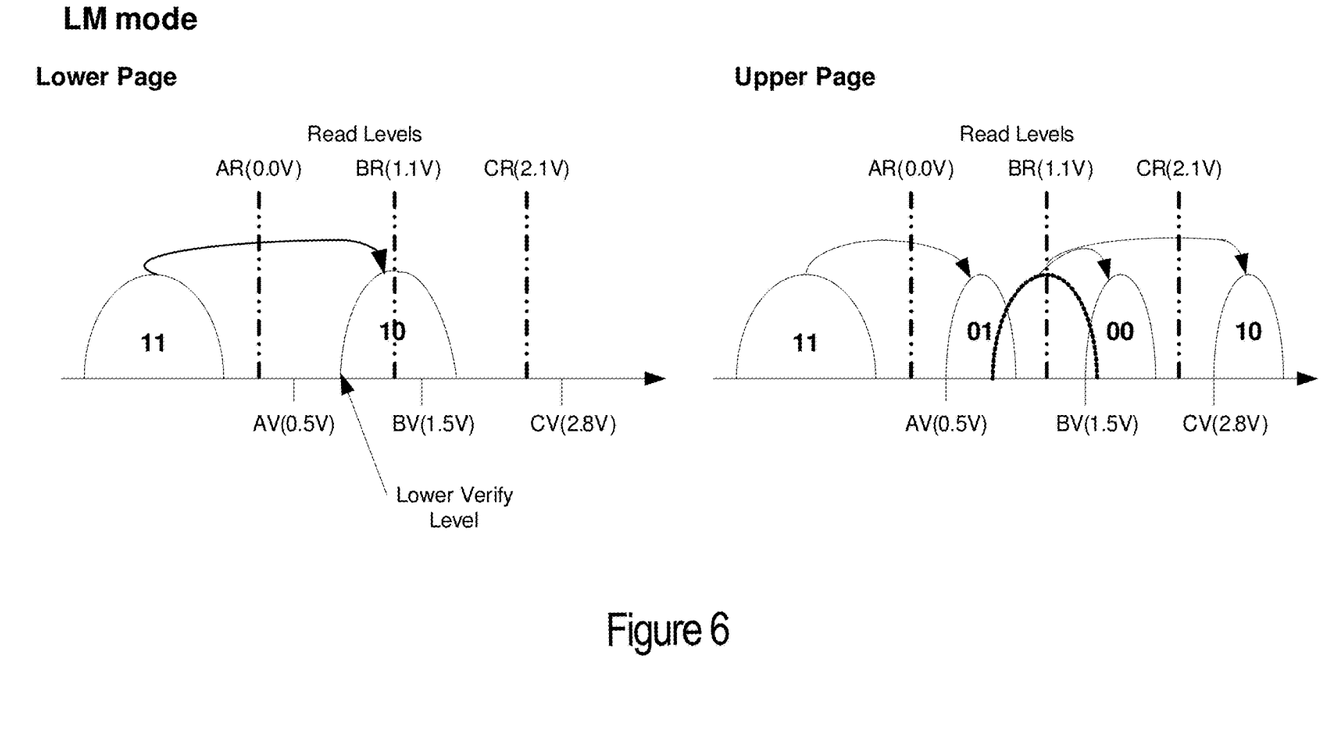
FIG. 6 is a diagram illustrating charge levels in a multi-level cell memory operated to store two bits of data in a memory cell.
Figure 7:
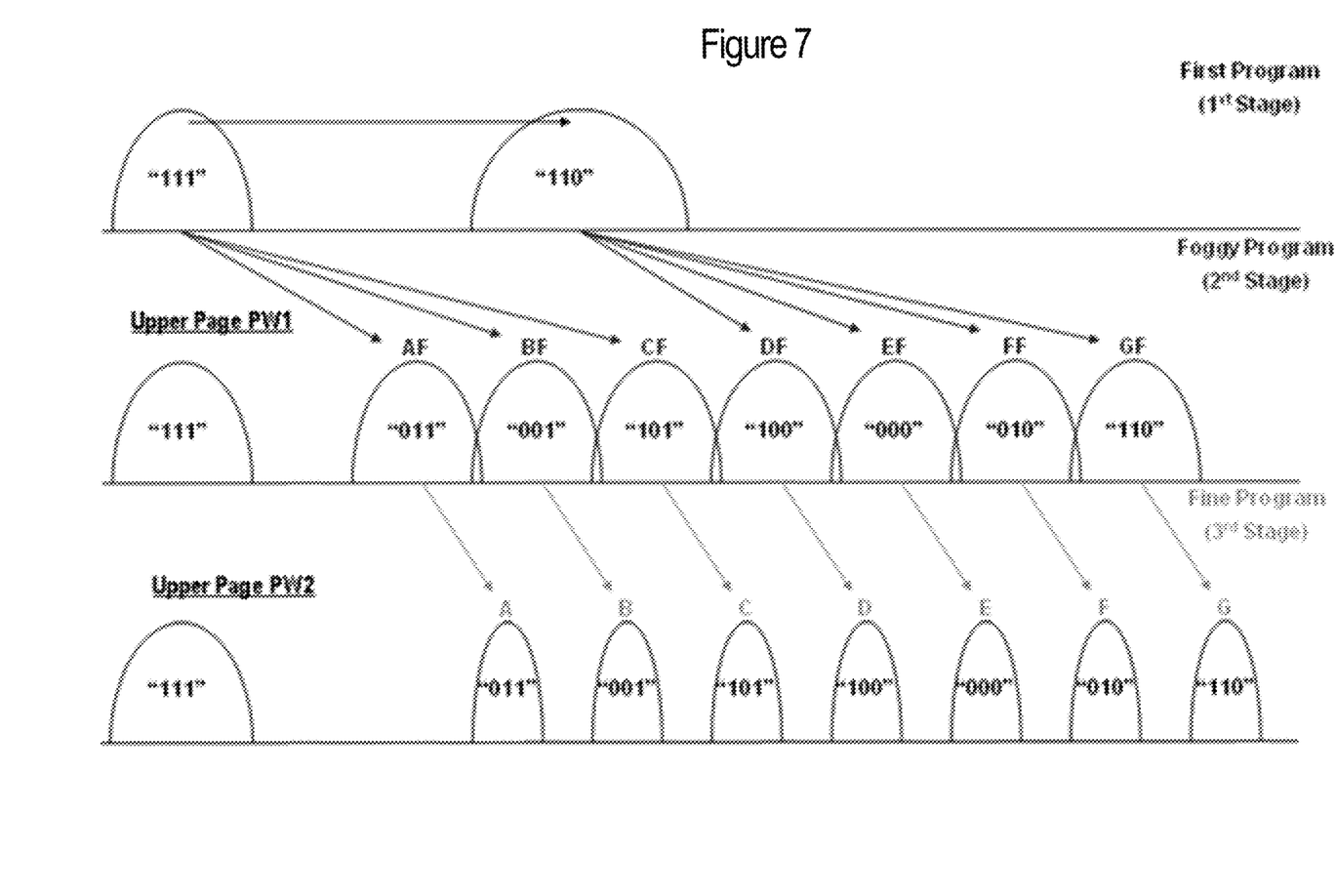
FIG. 7 is a diagram illustrating charge levels in a multi-level cell memory

FIG. 5 is diagram of a memory block including peripheral circuits. The heat source 410 of FIG. 4 may be the peripheral circuits 502 shown in FIG. 5. The peripheral circuits 502 may include an oscillator (OSC), high voltage circuit (HV), pumps, pads, metal capacitor layers, other sensors, reading circuits, programming circuits, registers, tape machines/logic, and/or other standard NAND circuitry that may produce heat. Some of the peripheral circuits 502 may generate heat which causes local heating of blocks closest to the peripheral circuits 502. As shown Block 0 and Block 1 would be at a higher temperature than Bock n and Block n+1, which are a greater distance from the peripheral circuits 502. A higher temperature may result in data retention charge loss as described with respect to FIG. 8 below. For blocks with lower temperatures (end dies or far from the heat source 410), there may be no charge loss and the state may retain their data and states as shown in FIGS. 6-7. The block movement described below with respect to FIGS. 9-10 may occur periodically or may correspond with other background operations (e.g. garbage collection or compaction). The goal for the block movement may be to level the data retention amongst all blocks. The data retention is worse at blocks with the highest local heat, so those high local heat blocks may need to be cycled/refreshed. This may include moving away from blocks near the heat source 410 or moving to blocks on the outer dies 402, 408.

Figure 8:
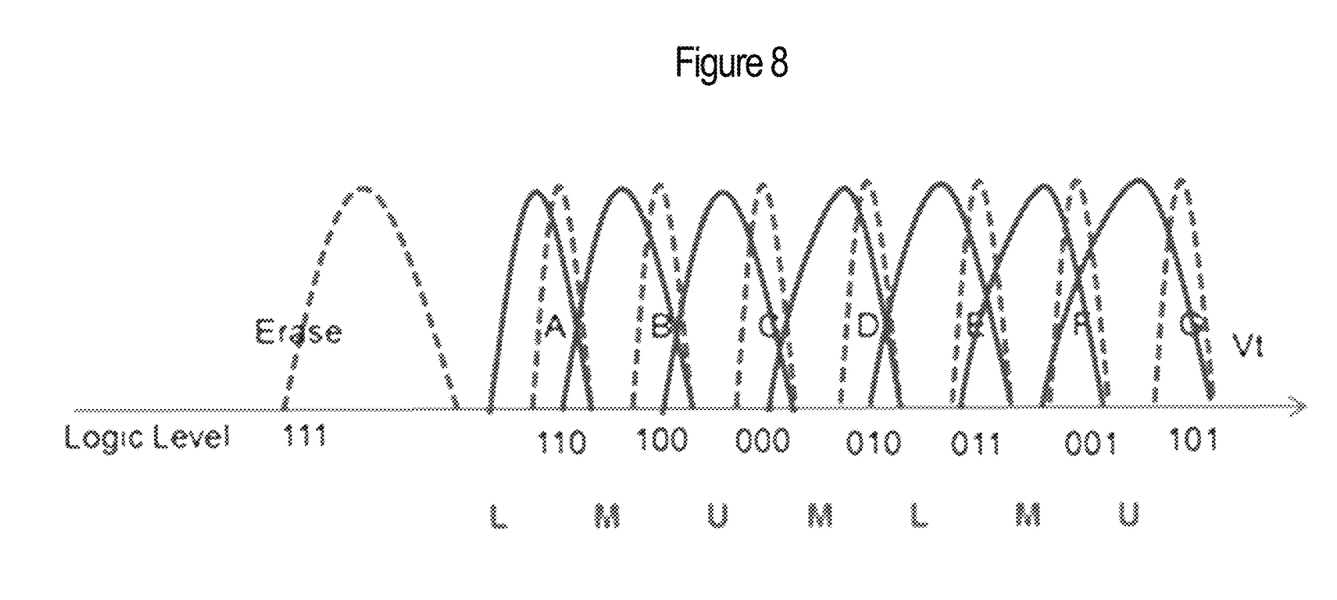
FIG. 8 illustrates an exemplary embodiment of charge loss in the eight states of memory from FIG. 7.

FIG. 6 is a diagram illustrating charge levels in a multi-level cell memory operated to store two bits of data in a memory cell. As described above, an increase in temperature may result in a charge loss, which may change the stored data in a memory cell. The memory cells may be operated to store two levels of charge so that a single bit of data is stored in each cell. This is typically referred to as a binary or single level cell (SLC) memory. SLC memory may store two states: 0 or 1. Alternatively, the memory cells may be operated to store more than two detectable levels of charge in each charge storage element or region, thereby to store more than one bit of data in each. This latter configuration is referred to as multi-level cell (MLC) memory. For example, MLC memory may store four states and can retain two bits of data: 00 or 01 and 10 or 11. Alternatively, MLC memory may store eight states for retaining three bits of data. FIG. 6 illustrates MLC memory with two bits of data (four states) and FIG. 8 illustrates MLC memory with three bits of data (eight states). The charge storage elements of the memory cells are most commonly conductive floating gates but may alternatively be non-conductive dielectric charge trapping material.

FIG. 6 illustrates one implementation of the four charge levels used to represent two bits of data in a memory cell. In implementations of MLC memory operated to store two bits of data in each memory cell, each memory cell is configured to store four levels of charge corresponding to values of "11," "01," "10," and "00." Each bit of the two bits of data may represent a page bit of a lower page or a page bit of an upper page, where the lower page and upper page span across a series of memory cells sharing a common word line. Typically, the less significant bit of the two bits of data represents a page bit of a lower page and the more significant bit of the two bits of data represents a page bit of an upper page.

FIG. 6 is labeled as LM mode which may be referred to as lower at middle mode and will further be described below regarding the lower at middle or lower-middle intermediate state. The LM intermediate state may also be referred to as a lower page programmed stage. A value of "11" corresponds to an un-programmed state of the memory cell. When programming pulses are applied to the memory cell to program a page bit of the lower page, the level of charge is increased to represent a value of "10" corresponding to a programmed state of the page bit of the lower page. The lower page may be considered a logical concept that represents a location on a multi-level cell (MLC). If the MLC is two bits per cell, a logical page may include all the least significant bits of the cells on the wordline that are grouped together. In other words, the lower page is the least significant bits. For a page bit of an upper page, when the page bit of the lower page is programmed (a value of "10"), programming pulses are applied to the memory cell for the page bit of the upper page to increase the level of charge to correspond to a value of "00" or "10" depending on the desired value of the page bit of the upper page. However, if the page bit of the lower page is not programmed such that the memory cell is in an un-programmed state (a value of "11"), applying programming pulses to the memory cell to program the page bit of the upper page increases the level of charge to represent a value of "01" corresponding to a programmed state of the page bit of the upper page.

FIG. 7 is a diagram illustrating charge levels in a multi-level cell memory operated to store three bits of data in a memory cell. FIG. 7 illustrates MLC memory with three bits of data which are stored in a single cell by establishing eight states or voltage level distinctions. This memory may be referred to as X3 memory. FIG. 7 illustrates the stages that may be used for programming three bit memory. In a first stage, the voltage levels are divided out at two levels, and at the second stage (i.e. foggy program), those two levels are divided up into the eight states without setting the distinct levels between states. At the third stage (i.e. fine program), the voltage levels for each of the eight states are separated and distinct. The fine programming establishes the voltage levels for each of the states. As compared with two bit memory, the three bit memory in FIG. 8 requires more exact programming voltages to avoid errors. Electron movement or loss from the charge values may result in problems. Read disturb is caused by an electron/charge gain, while data retention errors are caused by an electron/charge loss. Specifically, read disturb errors may be caused when cells in a memory block change over time (e.g. become programmed unintentionally through charge gain). Conversely, data retention errors may be caused when cells in a memory block change over time because a charge loss causes programmed data to be lost.

The changes to the charge states caused by local heat may apply to either 2-bit memory (FIG. 6), 3-bit memory (FIG. 7), or any other memory type. FIG. 8 illustrates an exemplary embodiment of charge loss in the eight states of memory from FIG. 7. The original states (dotted lines) are shifted to the new states (solid lines). In this case, a charge loss causes the states to be lowered, which may result in data retention errors. The cause of charge loss may be from local heat (e.g. proximity to a heat source such as peripheral circuits or location on a middle die). In one embodiment, the charge distribution shown in FIG. 7 may be for a block farther from a heat source (low local heat), while the overlapping distribution shown in FIG. 8 may be from a block close to a heat source (high local heat).

Figure 9:
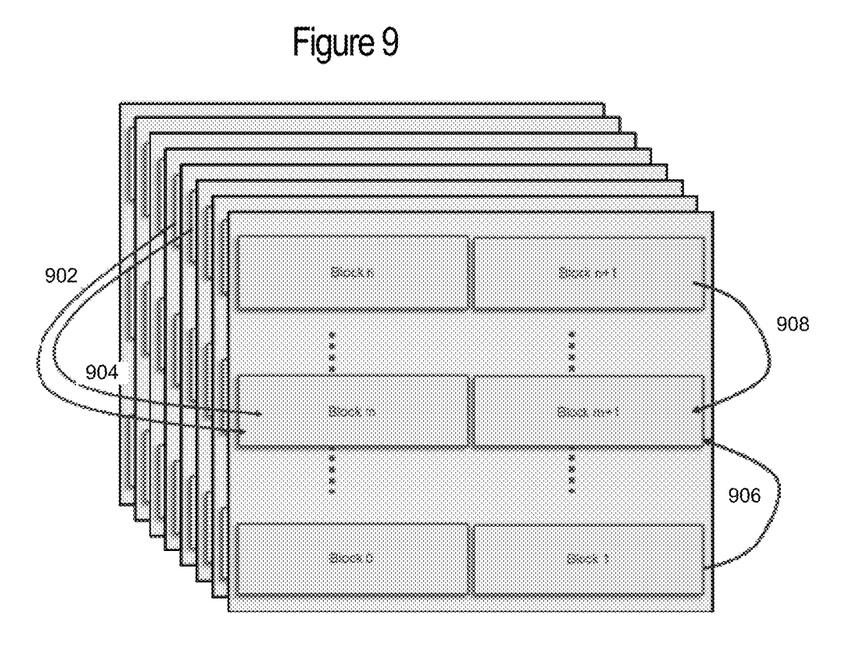
FIG. 9 is a diagram of an array of flash dies that illustrate relocation.

FIG. 9 is a diagram of an array of flash dies that illustrate relocation. The array of flash memory dies shown in FIG. 9 may be the same as the dies shown in FIG. 4. A cross die exchange may include movement from inner dies to an outer die as in 902, 904. FIG. 9 illustrates two cross die exchanges, one originates from a first inner die 902 and the other originates from a second inner die 904. However, both exchanges (from different inner dies) may be combined into the outer die. A data retention scan may be 902 and queuing from blocks to be exchanged is 904. The data retention scan may include obtaining a voltage distribution for determining data retention problems. In particular, it may include a read of the block to obtain the read distribution from which any data retention problems may be identified. The queue may include which blocks should be moved based on data retention problems. The queue maintains the list of these blocks until a convenient time (e.g. background operation availability) to move data. The queue may list the worst blocks first which are then relocated in 906. The worst blocks (in terms of BER or data retention) may be relocated to a safer (lower temperature) location. Accordingly, blocks close to the heat source may have poor data retention and can be moved further from the heat source. Finally, a leveling operation 908 may be performed in which all blocks should be comparable (balanced read). The blocks furthest from the heat source and on the outside die will have the best data retention, so a leveling of those blocks for balancing with other blocks may be helpful so that blocks are uniform across the whole die. Blocks with very low BER or no data retention problems may be utilized in place of the at-risk blocks. Leveling may be an attempt to even out the BER or data retention across all blocks so that they generally have a uniform distribution. In one embodiment, the BDRL relocation may considered with garbage collection, where the location of the relocated data may depend upon proximity to the heat source and/or location of the die.

Figure 10:
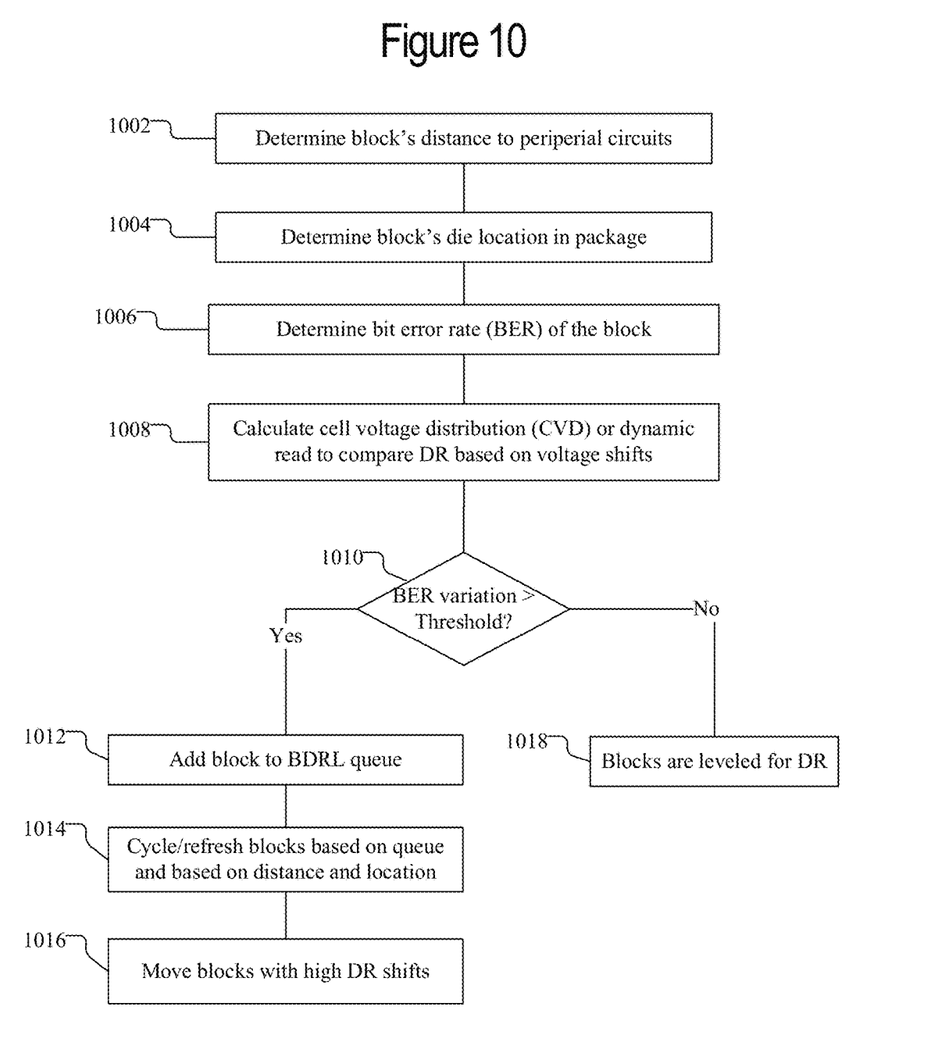
FIG. 10 is a flowchart illustrating block data retention leveling.

FIG. 10 is a flowchart illustrating block data retention leveling. The block data retention leveling scheme may determine which blocks to cycle or replace. In particular, the scheme may start with the free block list ("FBL"). Each block from the FBL may be subject to the method described in FIG. 10. In other words, for one of the blocks from the FBL, a distance is determined from the peripheral circuits (or other local heat source) as in block 1002. Likewise, a die location is determined in block 1004. The middle die tend to have a greater local heat, so the outer die are preferred (due to air circulation and heat dissipation) for improved data retention. In block 1006, the bit error rate ("BER") of the block is determined. The BER may be representative of data retention error. In other words, the BER may be a function of the location of the die or distance to the heat source. BER may be predicted based on estimated temperature (e.g. higher temperature=higher BER). In other embodiments, there may be other measurements that are used to reflect on the data retention, and BER is merely one example.

A cell voltage distribution ("CVD") or dynamic read is calculated in block 1008 to compare data retention based on voltage shifts. In block 1010, the BER variation is compared with a threshold. The threshold may be an acceptable amount of BER. The acceptable BER may be corrected through ECC. A threshold is a pre-determined number that set the limit which the BER may or may not cross. In one example, the threshold may be a percentage (e.g. 0.6% or 1%) that is based on the technology. If the BER variation exceeds the threshold, then the block is added to a BDRL queue in block 1012. The blocks are cycled/refreshed based on the queue and based on the distance (from the heat source) and the location (middle or end die) in block 1014. Finally, the blocks with the highest potential DR shifts are moved in block 1016. The highest potential DR shifts are when the local temperature is the highest and those blocks are at the greatest risk for data loss. Accordingly, those blocks can be moved to blocks furthest from the heat source and/or to outside die. When the BER variation does not exceed the threshold in block 1010, the blocks are leveled for data retention in block 1018.

The retention leveling described above is described at block level. The grouping of memory that is characterized by a block may be larger or smaller than the block size in other embodiments. For example, a meta-block or other block-group may be used rather than a block. As described above, a block is referred to as the unit of memory for retention leveling for simplicity and ease of reference. Likewise, a block may be multi-dimensional so that one block may represent a multi-dimensional group of memory. In particular, the algorithm for retention leveling of block data may apply to three dimensional (3D) memory as well as two dimensional (2D) memory.

The semiconductor memory elements located within and/or over a substrate may be arranged in two or three dimensions, such as a two dimensional memory structure or a three dimensional memory structure. In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

In the present application, semiconductor memory devices such as those described in the present application may include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magneto-resistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory. In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

It is intended that the foregoing detailed description be understood as an illustration of selected forms that the invention can take and not as a definition of the invention. It is only the following claims, including all equivalents that are intended to define the scope of the claimed invention. Finally, it should be noted that any aspect of any of the preferred embodiments described herein can be used alone or in combination with one another.

We claim:

1. A method for data retention leveling in a memory, the method comprising:
   scanning the memory for blocks with a high bit error rate;
   adding, based on the scanning, the blocks with the high bit error rate to a queue; and
   relocating the blocks in the queue, wherein the relocation is based on a proximity to the peripheral circuits of the memory or is based on a location of die.

2. The method of claim 1 wherein the location of die comprises either an end die or a middle die.

3. The method of claim 1 wherein the peripheral circuits act as a heat source that raise a temperature of blocks near the peripheral circuits.

4. The method of claim 1 wherein the high bit error rate exceeds a threshold bit error rate.

5. The method of claim 1 wherein a destination block for the relocating comprises a block with a lower local heat.

6. The method of claim 5 wherein the block with the lower local heat comprises a block furthest from the peripheral circuits or a block located on an end die of the memory.

7. The method of claim 1 wherein the relocating comprises:
   identifying blocks furthest from the peripheral circuits and located on an end die; and
   transferring data from the blocks with the high bit error rate in the queue to the identified blocks.

8. The method of claim 1 wherein the memory comprises a flash memory and the flash memory comprises a three-dimensional (3D) memory configuration, and a controller is associated with operation of and storing to the flash memory.

9. A storage device comprising:
   a memory comprising a plurality of die comprising blocks;
   peripheral circuits disposed adjacent to at least some of the blocks in the die;
   a controller coupled with the memory that is configured to level data retention of the blocks by exchanging high bit error rate blocks with free blocks based on a distance from the peripheral circuits or based on which of the die a block is located on.

10. The storage device of claim 9 wherein the peripheral circuits are a local heat source.

11. The storage device of claim 10 wherein the exchanging high bit error rate blocks with free blocks based on the distance from the peripheral circuits comprises relocating to blocks farther from the peripheral circuits during the exchanging.

12. The storage device of claim 9 wherein the die are either an end die or a middle die.

13. The storage device of claim 12 wherein the exchanging high bit error rate blocks with free blocks based on which of the die a block is located on comprises using blocks on the end die as the free blocks because local temperature is lower at the end die as compared with the middle die.

14. The storage device of claim 9 wherein the exchanging further comprises the controller being configured for:
   scanning the memory for blocks with data retention problems based on the high bit error rate;
   adding, based on the scanning, the blocks with the bit error rate above a threshold bit error rate to a queue; and
   exchanging the blocks in the queue.

15. The storage device of claim 14 wherein the high data retention blocks for the exchanging are those blocks with a bit error rate above the threshold bit error rate that are added to the queue.

16. The storage device of claim 9 wherein the memory comprises a three-dimensional (3D) memory configuration, and wherein a controller is associated with operation of and storing to the flash memory.

17. A method for block data retention leveling in a memory, the method comprising:
   evaluating the data retention capability of blocks;
   generating a queue of those blocks with a lowest data retention capability; and
   relocating data from blocks in queue to blocks in a free block list that are furthest from peripheral circuits of the memory.

18. The method of claim 17 wherein the evaluating further comprises using a bit error rate or voltage level shifting to evaluate the data retention.

19. The method of claim 18 wherein blocks with the lowest data retention capability comprises blocks with a bit error rate above a threshold bit error rate or blocks with a voltage level shifting beyond a threshold voltage level shift.

20. The method of claim 17 wherein the moving further comprises moving to blocks located only on end dies.

* * * * *